E. H. TURNER.
KAFIR CORN HEADER.
APPLICATION FILED AUG. 2, 1916.
1,252,631.
Patented Jan. 8, 1918.
3 SHEETS—SHEET 2.
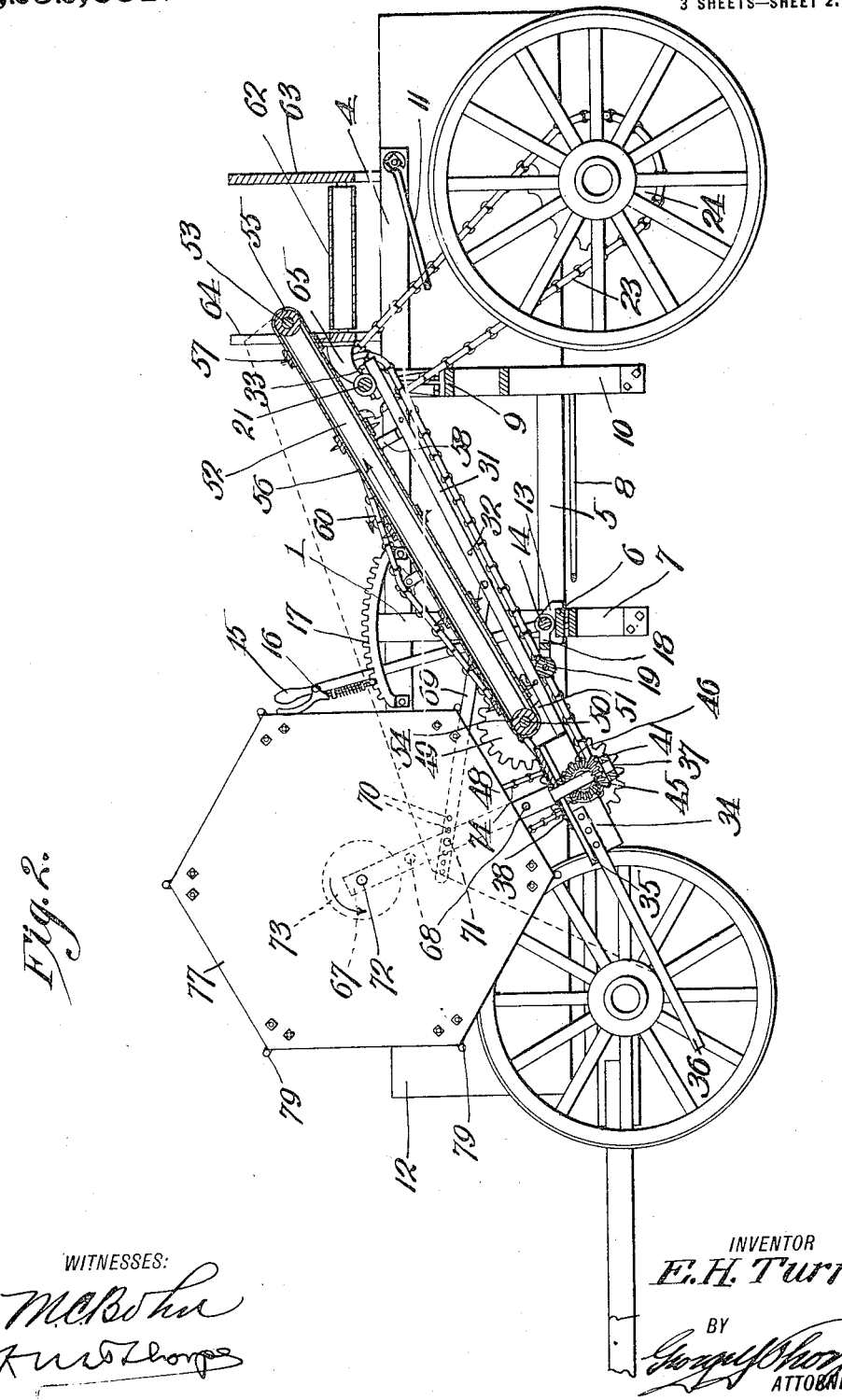
WITNESSES:
INVENTOR
E. H. Turner
BY
ATTORNEY

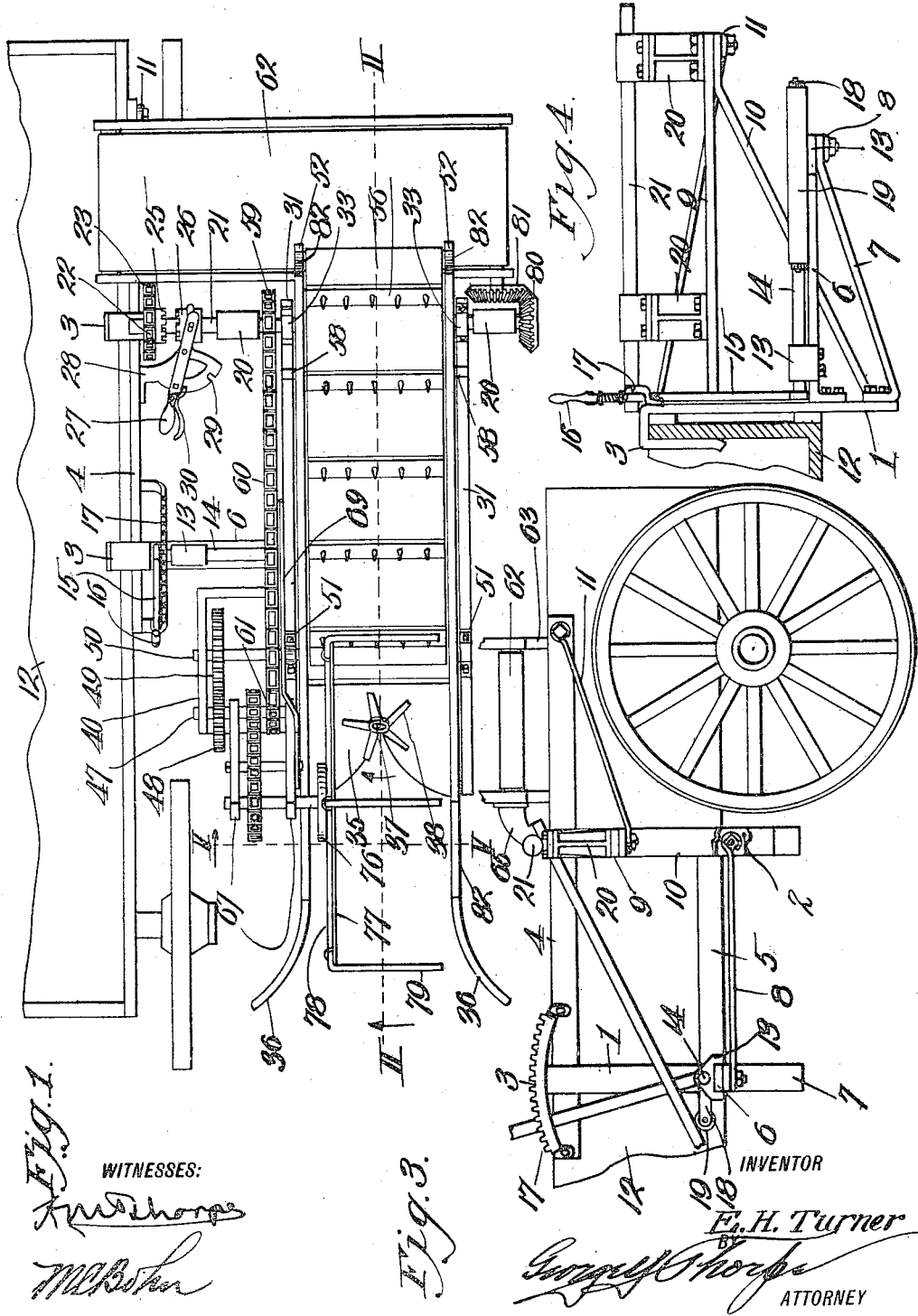

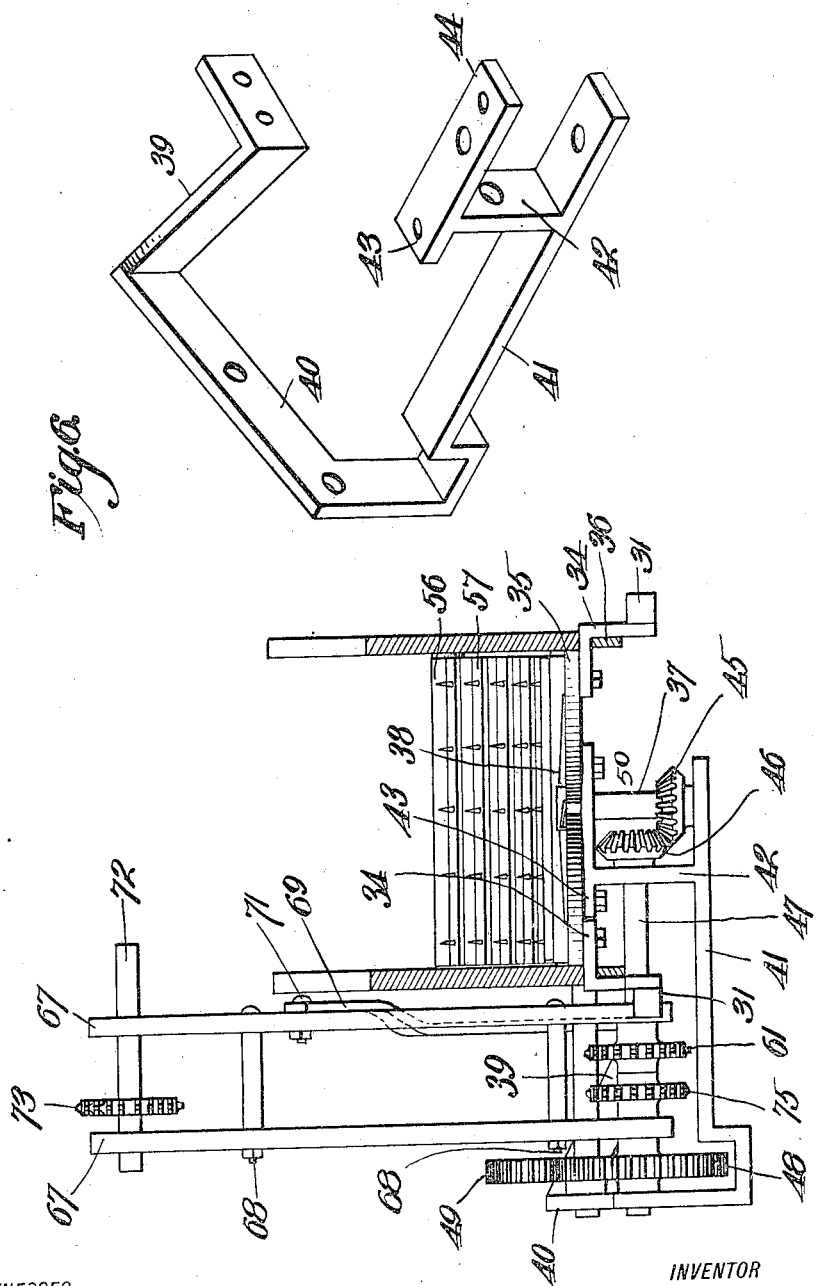

UNITED STATES PATENT OFFICE.

ELI H. TURNER, OF JEFFERSON, OKLAHOMA.

KAFIR-CORN HEADER.

1,252,631. Specification of Letters Patent. Patented Jan. 8, 1918.

Application filed August 2, 1916. Serial No. 112,850.

*To all whom it may concern:*

Be it known that I, ELI H. TURNER, a citizen of the United States, residing at Jefferson, in the county of Grant and State of Oklahoma, have invented certain new and useful Improvements in Kafir-Corn Headers, of which the following is a specification.

This invention relates to Kafir corn headers and more especially to that class of devices which are mounted upon a wagon and perform the functions of heading the corn and delivering the heads into the wagon box as the wagon is drawn across the field, and my object is to produce a simple, and inexpensive Kafir corn heading attachment of the class mentioned, which performs its function efficiently and which can be quickly and easily mounted on or removed from a wagon.

With this general object in view and others as hereinafter appear, the invention consists in certain novel and peculiar features of construction and combinations of parts as hereinafter described and claimed; and in order that it may be fully understood reference is to be had to the accompanying drawings, in which:

Figure 1, is a plan view of a Kafir corn header embodying my invention, attached to the side of a wagon box.

Fig. 2, is a vertical section of the same on the line II—II of Fig. 1.

Fig. 3, is a side view of the frame for supporting the operating mechanism and also shows a part of the wagon.

Fig. 4, is a front view of the construction shown by Fig. 3, but lacking the conveyer shown by Fig. 3.

Fig. 5, is an enlarged section taken on the line V—V of Fig. 1.

Fig. 6, is a detail perspective view of a bearing bracket forming part of the header.

In the said drawings the supporting frame for the operating mechanism of the header comprises a pair of vertical bars 1, 2, terminating at their upper ends in down-turned hooks 3 for engagement with the upper edge of one side of the wagon box and said bars are connected at their upper ends by a longitudinal bar 4, and at its lower ends by a longitudinal bar 5. Bar 1 is equipped at its lower end with an outwardly projecting arm 6, connected to the lower end of bar 1 by an inclined brace 7 and to the lower part of bar 2 by an inclined brace 8, it being necessary to properly brace arm 6, as it forms the support of the heaviest part of the operating mechanism and must sustain the strain incidental to the heading operation.

Bar 2, is provided with an outwardly projecting supporting arm 9 connected by an inclined brace 10 to the lower end of said bar and braced against rearward movement by a brace 11 extending from its outer end rearwardly and upwardly to the rear end of bar 4.

The frame as suggested is suspended upon one side of the wagon box 12, by engagement of the hooks 3 over said side as shown most clearly in Figs. 1 and 4. Arranged just above the supporting arm 6 and journaled in bearing 13, secured to said arm is a transverse rock shaft 14, equipped at its inner end adjacent the side of the wagon box with an upwardly projecting lever 15 and said lever is equipped with a latch mechanism 16 to engage a notched sector 17 secured to bar 4. The rock shaft is provided with a forked arm 18 equipped with a roller 19 for vertically adjusting the cutting mechanism and reel hereinafter identified.

20 is applied to a pair of bearing brackets secured to arm 9 and forming a journal for the transverse shaft 21 equipped near the side of the wagon box with a journaled sprocket wheel 22 connected by a sprocket chain 23 with the sprocket wheel 24 secured rigidly in any suitable manner to the adjacent rear wheel of the wagon. Sprocket 22 is provided with a clutch member 25 adapted for engagement by a sliding clutch member 26 rotatable with shaft 21, and connected in the customary manner to throw clutch member 26 into or out of engagement with clutch member 25 is a lever 27 fulcrumed on a bracket 28 secured to bar 4 and provided with notches for engagement by a latch 30 carried by lever 27, the engagement of the latch 30 with the innermost or outermost notch 29 serving to hold the clutch member 26 out of or into engagement with clutch member 25 as the case may be so that power shall be transmitted from the sprocket wheel 24 to the shaft 21.

A pivoted framework for the support of all of the operating mechanism except a transverse conveyer hereinafter described, is constructed as follows:

31 is applied to a pair of parallel beams which incline downwardly and forwardly from a point above arm 9 to a point forward of arm 6, said beams being connected by a plurality of cross rods 32 and equipped at their rear or upper ends with bearings 33 by which they are suspended from shaft 21, the said beams resting near their front ends on the antifriction roller 19 carried by the forked arm of rock shaft 14, so that when the lever is operated the roller with the minimum of friction will impart or permit of vertical adjustment of the said beams. This will be readily understood by reference to Figs. 2 and 3.

Secured to the front ends of beams 31 are angle castings 34 and connecting said castings and occupying an inclined plane parallel with but above that occupied by beams 31 is a plate 35 provided with a bifurcated front end, the bifurcation being flaring for a purpose which hereinafter appears, and secured to and projecting from the opposite side portions of the angle castings 34, is a pair of forwardly extending gathering fingers 36, said fingers being for the purpose of straightening up laterally inclined stalks of corn and therefore insuring their entrance into the flaring bifurcation of the plate 35.

Extending through the constricted rear end of the bifurcation of plate 35 perpendicular to the face of said plate, is a short shaft 37 equipped at its upper end with a plural-armed rotary knife or cutter 38, the cutting edges being preferably bearded or serrated. Said knife is adapted to operate in a shearing relation to one side of the wall of the bifurcation, for the purpose of severing the heads from the stalks of corn as hereinafter explained.

Carried by the pivoted supporting frame is a bearing bracket consisting of a transversely extending part 39 secured at its outer end to the inner beam 31, a part 40 extending downwardly and forwardly from the inner end of part 39, a part 41 extending outwardly from the front or lower end of part 40, a part 42 extending upwardly from part 41 and a pair of laterally projecting parts 43 and 44 projecting from the upper end of part 42 and secured to the bifurcated plate 35.

The part 44 and the underlying end of part 41 constitute bearings for the cutter carrying shaft 37 and secured to said shaft is a bevel gear 45 enmeshed with a bevel gear 46 secured on the outer end of a horizontal shaft 47 journaled at its outer end in part 40 of the said bracket, said shaft at an intermediate point extending through one of the angle plates 34. Secured on shaft 47 is a gear wheel 48 enmeshed with a larger gear wheel 49 on a transverse shaft 50 journaled at its inner end in part 40 and also journaled in bearings 51 secured upon beams 31.

An inclined endless conveyer comprises a pair of side bars 52 fitting loosely at their lower ends on shaft 50 and forming journals at their upper ends for a shaft 53, a pair of rollers 54 and 55 secured on shafts 50 and 53 respectively and an endless bolt 56 connecting said rollers and provided with cross slats 57, a pair of standards 58 connecting bars 52 with the pivoted bars 31 to support the upper end of said conveyer above the shaft 21. A sprocket wheel 59 secured on shaft 21 is connected by a sprocket chain 60 with the sprocket wheel 61 secured on shaft 47 to transmit power to the latter and then to the cutter through bevel gears 46 and 45 and to the endless belt conveyer 56 through the gear wheels 48 and 49, it being apparent that through the mechanism described, the cutter rotates in the direction indicated by the arrow in Fig. 1, and that the upper strand of the endless belt travels in the direction indicated by the underlying arrow Fig. 2, so that said belt shall carry the heads of the corn upwardly and rearwardly.

The upper end of said belt overhangs a horizontal endless conveyer 62 of conventional type, said conveyer being mounted in and between a pair of upstanding walls 63, the front wall being recessed at 64 to receive the upper end of the inclined belt conveyer. The inner ends of the walls and conveyer 62 rest upon the adjacent side of the wagon box 12 and the outer portion of the said conveyer is provided with a pair of forwardly projecting arms 65 fitting on the transverse shaft 21.

67 is applied to a pair of upwardly and forwardly inclined standards mounted on shaft 47 at their lower ends and connected by tie rods 68 and said standards are braced against swinging movement by an inclined brace 69 secured at its rear end to the adjacent beam 31 and at its front end is provided with a series of holes 70 through any one of which a bolt 71 may unite it to the adjacent standard 67, the engagement of the bolt with different holes securing the upper end of the standard at different points of adjustment.

Journaled in the upper ends of the standards 67 is a shaft 72 equipped with a sprocket wheel 73 connected by a chain 74 to a sprocket wheel 75 on shaft 47 so that power transmitted to the last-named shaft shall effect rotation of shaft 72 in the direction indicated by the adjacent arrow Fig. 2. Secured on shaft 72 is a reel comprising a hub 76, a thin metal disk 77 and a series of radiating arms 78 secured to the disk and hub and provided with outwardly projecting horizontal arms 79, for striking rearwardly upon the heads of the stalks of corn as the heads are severed by the rotary cutter, the force of the blow being sufficient to knock the heads down on the inclined conveyer in order that the latter shall carry them upwardly and eventually discharge them upon the transverse conveyer, and in order that the latter shall carry the heads to and dump them in the wagon box, the outer end of the shaft 21 is equipped with a bevel gear 80 meshing with a bevel gear 81 on the outer roller of the endless belt conveyer 62.

To guard against any chance of the heads of the corn falling off the plate or the inclined conveyer through the forceful impact of said heads as they are severed, by the reel arms, side-boards 82 are secured upon the side bars 52 of the inclined conveyer, said side-boards extending forwardly by preference over and upon the plate and guide fingers. The side boards are shown in full lines Fig. 1, and in dotted lines Fig. 2, being dotted in the last-named figure to avoid hiding parts which would otherwise be hidden in said figure.

In driving to or from the field, the lever 27 is operated to unclutch the clutch members 25 and 26. When ready to head the Kafir corn or the like, said clutch members are interlocked so that power shall be transmitted from the adjacent wagon wheel to the operative parts of the machine as hereinbefore explained. The wagon is then driven across the field parallel with the first row of corn to be headed so that the stalks of such row shall successively enter the space between the guide fingers. Eventually each stalk of corn will enter the bifurcation of the plate within the range of action of and be cut by the rotary cutter and at the moment each stalk is cut one of the reel arms will strike the head and knock it rearwardly upon the rear end of the inclined elevator. The elevator will convey the heads to and dump them onto the transverse conveyer 62 and said conveyer will discharge them into the wagon box where a man will stand to effect their proper distribution. When the wagon is fully loaded the clutch members will be unclutched and the wagon driven to the point where it is to be unloaded. If preferred there may be an additional wagon so that when one is loaded the header mechanism can be unhooked therefrom and hooked upon the second wagon so that the harvesting may continue almost uninterruptedly. To transfer the header mechanism from one wagon to another, it will of course be necessary to disconnect a pair of the links of the driving chain to permit it to be disengaged from the driving sprocket wheel 24. The chain will then be engaged with the corresponding sprocket wheel of the other wagon and the ends reconnected. Any suitable chain capable of separation between a pair of the links may be employed.

From the above description it will be apparent that I have produced a header embodying the features of advantage enumerated as desirable and I wish it to be understood that while I have illustrated and described the preferred embodiment of the invention, I reserve the right to make all changes properly falling within the spirit and scope of the appended claims.

I claim:

1. The combination with a wagon, of a horizontal bar, a pair of vertical bars secured to the horizontal bar and provided with hooks engaging over the upper edge of one side of the wagon, an arm projecting outwardly from each of said pair of bars, the rearmost of said pair of arms being disposed in a higher plane than the other arm, means for bracing said arms to prevent downward movement of their outer ends, means to brace said arms against rear swinging movement at their outer ends, bearings on the rearmost of said arms, a transverse drive shaft journaled in said bearings, a transverse rock shaft journaled on the other of said arms and provided with a forwardly projecting crank, a downwardly and forwardly inclined frame pivoted on the drive shaft and resting on said crank arm for vertical adjustment thereby, an endless elevator in said inclined frame, means to transmit power from the drive shaft to the endless elevator, a rotary cutting mechanism at the front end of and above the said elevator, a driven reel to knock the severed heads of corn upon the endless conveyer, and means to receive the said heads from said elevator and deliver them to the wagon.

2. The combination with a wagon, of a horizontal bar, a pair of vertical bars secured to the horizontal bar and provided with hooks engaging over the upper edge of one side of the wagon, an arm projecting outwardly from each of said pair of bars, the rearmost of said pair of arms being disposed in a higher plane than the other arm, means for bracing said arms to prevent downward movement of their outer ends, means to brace said arms against rear swinging movement at their outer ends, bearings on the rearmost of said arms, a transverse drive shaft journaled in said bearings, a transverse rock shaft journaled on the other of said arms and provided with a forwardly projecting crank, a downwardly and forwardly inclined frame pivoted on the drive shaft and resting on said crank arm for vertical adjustment thereby, an endless elevator in said inclined frame, a rotary knife at the front end of the inclined frame and elevator, a transverse shaft geared to said cutter to operate same, a reel movable with the lower end of the inclined frame and geared to said shaft for operating the reel, means to transmit power from the cutter operating shaft to the endless elevator, and means to receive the severed heads of corn from the endless elevator and deliver them to the wagon.

3. The combination with a wagon, of a horizontal bar, a pair of vertical bars secured to the horizontal bar and provided with hooks engaging over the upper edge of one side of the wagon, an arm projecting outwardly from each of said pair of bars, the rearmost of said pair of arms being disposed in a higher plane than the other arm, means for bracing said arms to prevent downward movement of their outer ends, means to brace said arms against rear swinging movement at their outer ends, bearings on the rearmost of said arms, a transverse drive shaft journaled in said bearings, a transverse rock shaft journaled on the other of said arms and provided with a forwardly projecting crank, a downwardly and forwardly inclined frame pivoted on the drive shaft and resting on said crank arm for vertical adjustment thereby, an endless elevator in said inclined frame, a rotary knife at the front end of the inclined frame and elevator, a transverse shaft geared to said cutter to operate same, a reel movable with the lower end of the inclined frame and geared to said shaft for operating the reel, means to transmit power from the cutter operating shaft to the endless elevator, an endless conveyer extending from a point below the upper end of the endless elevator, to and over the wagon, and means for transmitting power from the drive shaft to said conveyer.

In testimony whereof, I affix my signature, in the presence of two witnesses.

ELI H. TURNER.

Witnesses:
R. E. TANTON,
ED. L. QUIGLEY.

Copies of this patent may be obtained for five cents each, by addressing the "Commissioner of Patents, Washington, D. C."